United States Patent Office 3,519,466
Patented July 7, 1970

3,519,466
METHOD FOR COLOR PRINTING THERMO-
PLASTIC OR RUBBER ARTICLES
Akiyuki Akamatsu, Yokohama, Japan, assignor to Toyo
Kako Co., Ltd., Tokyo, Japan, a corporation of Japan
No Drawing. Filed July 11, 1966, Ser. No. 563,965
Claims priority, application Japan, July 15, 1965,
40/42,263
Int. Cl. D06p 1/76
U.S. Cl. 117—38                                          8 Claims

ABSTRACT OF THE DISCLOSURE

A process for printing on a molded article of a thermoplastic resin or a rubber which comprises heating an ink containing a benzene-soluble, reactive dye and a wetting agent soluble in benzene in contact with the surface of the molded article which contains an organometallic compound, at a temperature higher than 50° C. but lower than the softening point of the article, whereby the dye permeates the article and reacts with the organometallic compound to become fixed therein. The formed print is resistant to abrasion and solvents and is sharp. The amount of the organometallic compound required to fix the dye is 0.01 to 3.0% of the article and the amount of the wetting agent is 3 to 30%. The wetting agent serves to dissolve the ink and may be a mineral oil, an animal or vegetable fat or oil, a plasticizer, a higher fatty acid or the like.

---

This invention relates to a method for color printing the surfaces of thermoplastic or rubber articles. More particularly, the present invention relates to a method for color printing thermoplastic or rubber articles, wherein substances incorporated in the articles are bound with dyes in printing inks applied on the surfaces of said articles.

Hitherto, it has been very difficult to print firmly fixed designs or characters on the surfaces of the molded articles of the thermoplastic, particularly polyolefinic, resins or rubbers, because they have no radicals or groups in their molecules to react with inks applied thereon, and because all the conventional film-forming type inks applied for printing makes prints not firmly bound with the articles but only physically laid on the surfaces of the articles. Thus, the prints are readily taken off or scratched by rubbing, or washed off with solvents. Recently, a method using a new type printing ink has been developed. This newly developed printing ink comprises essentially colorants which diffuse into the body of the thermoplastic or rubber molded articles, and liquid mediums which assist the diffusion of the colorants. Using this printing ink, relatively fast coloring prints on thermoplastic resins, particularly polyolefinic resins and polyacetals, can be afforded. However, this method is not fully satisfactory. Because colorants or dyes in the inks diffuse or penetrate into articles but not fixed to or bound with the resins of the articles, on heating and/or with the lapse of time, the dyes or colorants diffused in the articles are apt to migrate or bleed out to dim the contour of the prints.

Therefore, an object of the present invention is to provide a method for affording fast coloring prints on the surfaces of molded articles of thermoplastic resins or rubbers.

Another object of the present invention is to provide a method for affording fast color prints on the surfaces of molded articles of thermoplastic resins or rubbers, said prints being chemically and physically firmly fixed to said thermoplastic resins or rubbers.

Still another object of the present invention is to provide a method for making firmly fixed color prints on the surfaces of molded articles of thermoplastic resins or rubbers which are prior to molding modified so as to be acceptable of said color prints, otherwise said firmly fixed color prints on said articles being very difficult.

Above described objects can be achieved by the present invention. According to the present invention, a method for making color prints on the surfaces of shaped or molded articles of thermoplastic resins such as polyolefins, polyethers, polyvinylchloride, polystyrene and the like, or rubbers such as natural or synthetic rubbers, said shaped articles being molded by injection, extrusion, blow, casting, compression, calender, powder molding method or the like, which comprises incorporating one of organometallic compounds or their mixture with said thermoplastic resins or rubbers, molding said articles by any one of said molding methods, contacting said surfaces of said articles with dye-ink containing reactive dye, heating at least the contacting area of the articles to penetrate said ink into said articles and, at the same time, to react said organometallic compound with said reactive dye with the result of producing colored material.

Many thermoplastic resins and rubbers have no radicals or groups which can combine with dyes. Therefore, the essential aspect of the present invention lies in the addition of some organometallic compound which is capable of combining with dyes to thermoplastic resins or rubbers prior to molding of articles to be printed.

The organometellic compound must be selected from those having compatibility with said thermoplastic resins or rubbers. According to the mehtod of the present invention dye-ink containing reactive dye is applied on the surface of the article to be printed, and then, the surface is heated. By heating, said organometallic compound in the article reacts with reactive dye in the dye-ink to produce coloring material, which is fixed in said article. Thus formed coloring material makes up the color print of the article. Therefore color prints according to the present invention are stable, and, do not show the migration of color by heat, or bleeding of color.

In the practice of the present invention, organometallic compound capable of combining with dye must be present in the article to be printed. In some cases, such organometallic compound has already been contained in the article. For example, commercially available polypropylene molding material contains a small quantity of such compound as stabilizer for photo-deterioration of the polymer. Delrin resin (polyether resin) is usually molded along with metallic soap as lubricant. Thus these thermoplastic articles may be color printed without the addition of an additional amount of organometallic compound. However, the article of these resins does not contain a sufficient amount of organometallic compound to fiix all the dye penetrated into the article. Uncombined and left dye in the article will migrate and ooze out to the surface of the article by heat. This uncombined dye may be extracted and removed by solvents such as benzene and the like. This after treatment is troublesome. For the complete reaction of the dye penetrated into the article to avoid the troublesome after treatment, a suitable amount of organometallic compound must be added to the plastics before molding, so that the article contains at least 0.01% of the organometallic compound.

Many molded articles of polyvinylchloride or rubbers have a relatively large amount of organometallic compound of Pb, Sn or Zn. These compounds act as stabilizer or vulcanizing accelerator. For these molded articles, the addition of organometallic compound, which may be added before or during the molding operation, may not be necessary. However, to obtain light fast color prints, a suitable organometallic compound is preferably added.

Generally, the larger amount of the organometallic compound is contained in the article, the easier coloring of the article is achieved. However, organometallic compound exceeding 2% does not further improve coloring properties of the resins. And organometallic compound less than 0.01% does not give sufficient coloring properties. As to thermoplastics of polyolefins, polyethers and polystyrenes, organometallic compound more than 3% gives adverse effects on the physical properties of their mold articles and also gives poor moldability. Therefore, the content of organometallic compounds in molded article is between 0.01 and 3.0%, preferably between 0.05 and 1.0%.

The organometallic compound which is incorporated with thermoplastic or rubber molding materials may be powder, liquid or solution in suitable solvent. Thermoplastic molding materials incorporated with organometallic compound are then molded into required articles. A molding temperature depending on a sort of plastics and a type of molding ranges from 150° C. for polyethylene to over 200° C. for polyether. Thus, the organometallic compound which is used must be of sufficiently heat resistance. And the organometallic compound which is suitably used for the present invention must be one compatible with and retainable in thermoplastic resins and/or rubbers. Furthermore, the organometallic compound must not be of dark color for the purpose to give molded articles various colors. The color material is developed by the result of the chemical reaction of the metal component of the organometallic compound with the reactive dye in the dye-ink. Light fast properties of the color materials will depend on the kind of metal in the organometallic compound which is used. Therefore, organometallic compounds suitably used for the present invention are organometallic compounds of Ni, Zn, Al, Cr, Sn, Pb, Ca, Ba, Cd and Mg, which are soluble in benzene, but does not boil at lower than 150° C. nor decompose at 150° C. for at least 5 minutes. Representative of these organometallic compounds are Ni, Zn, Al, Cr, Sn Pb, Ca, Ba, Cd and Mg salts of higher fatty acids such as stearic, palmitic, and oleic acids and those salts of naphthenic-acid.

Reactive dyes are those having such a reactive group in their molecule as OH group. Many of them are known. However, in the present invention only the reactive dyes which penetrate or diffuse into thermoplastic resins or rubbers, namely, which are soluble in organic solvents, can be used. Such dyes are commercially available as Polyplon dyes (trade name) from Hodogaya Chemical Co., and Sumiplene dyes (trade name) from Sumitomo Chemical Co. But both of them are dispersing dyes for fibers, and contain dispersing agent. Dispersing agent is insoluble in solvents of the ink of the present invention and harmful to make the ink. For the present invention reactive dyes containing no dispersing agent and soluble in organic solvents are desired.

An ink using above described reactive dye is made. This ink is applied on the surface of thermoplastic or rubber article which contains above described organometallic compound, and then is heated. Dye in the ink will diffuse into the article and combine with the organometallic compound present there. Then insoluble coloring material is generated to develop its particular color. If organometallic compound is not present, then color is not developed. Some dyes can not combine with a few kinds of metals. Same dye can combine with different metals resulting in coloring materials with different latitude and considerably different light resistance.

Above described Polyplon and Sumiplene dyes, and metals except Ni and Zn, if they react, make only coloring materials with considerably low light resistance. Light resistance of the coloring materials which are produced by the reaction between the representative metals and dyes is listed in Table 1.

TABLE 1.—LIGHT RESISTANCE OF COLORING MATERIALS

| Dye | Reacted Metal | | | | | | | | | |
|---|---|---|---|---|---|---|---|---|---|---|
| | Ni | Zn | Al | Sn | Pb | Cr | Ca | Ba | Cd | Mg |
| Polyplon Yellow GL | 5 | 2 | x | 1 | 2 | | | | | |
| Polyplon Yellow FGL | 4 | 3 | 2 | 2 | 2 | | | | | |
| Polyplon Yellow GRL | 4 | 1 | 1 | 1 | 1 | 1 | 1 | 1 | 2 | 1 |
| Polyplon Yellow FGRL | 5 | 1 | 1 | 1 | 1 | 1 | 1 | x | 1 | 1 |
| Polyplon Orange GL | 5 | 2 | 1 | x | 1 | 1 | 1 | x | 1 | 1 |
| Polyplon Scarlet RL | 4 | x | x | x | 1 | x | x | x | 1 | x |
| Polyplon Red BL | 4 | 3 | 3 | 2 | 2 | 1 | 2 | 1 | 2 | 2 |
| Polyplon Red 3BL | 5 | 3 | 3 | 2 | 2 | | | | | |
| Polyplon Red FRL | 4 | 4 | 2 | 2 | 1 | | | | | |
| Polyplon Violet RL | 5 | 2 | 1 | 1 | 1 | 1 | 1 | 1 | 2 | 1 |
| Polyplon Violet BL | 5 | 2 | 1 | 1 | 1 | | | | | |
| Polyplon Blue 3RL | 5 | 3 | 1 | 1 | 1 | | | | | |
| Polyplon Blue Black BL | 5 | 4 | 2 | 2 | 2 | | | | | |
| Polyplon Blue GCL | 5 | 5 | 1 | 2 | 1 | 1 | 2 | 1 | 2 | 1 |
| Polyplon Blue 2GL | 5 | 5 | 1 | 2 | 1 | | | | | |
| Polyplon Blue TBL | 4 | 4 | 1 | 1 | 1 | | | | | |
| Polyplon Blue FGL | 4 | 4 | 2 | 1 | 1 | | | | | |
| Polyplon Green F₃BL | 5 | 4 | 1 | x | 2 | | | | | |
| Polyplon Green BL | 5 | 5 | x | x | 2 | x | x | x | 1 | x |
| Polyplon Brown BL | 4 | x | x | x | x | | | | | |
| Polyplon Brown TL | 3 | x | x | x | x | x | x | x | x | x |
| Sumiplene Yellow M-G | 5 | 3 | 1 | 2 | 1 | | | | | |
| Sumiplene Yellow M-3G | 3 | 3 | 2 | 2 | 2 | 2 | 1 | 1 | 2 | 1 |
| Sumiplene Yellow M-GR | 3 | 1 | 1 | 1 | 2 | | | | | |
| Sumiplene Orange M-G | 4 | 1 | 1 | 1 | 2 | 1 | x | x | 3 | x |
| Sumiplene Orange M-R | 4 | 2 | 1 | 1 | 1 | | | | | |
| Sumiplene Red M-G | 3 | 3 | 2 | 2 | 2 | | | | | |
| Sumiplene Red M-3B | 3 | 3 | 2 | 2 | 2 | 2 | 1 | x | 2 | 1 |
| Sumiplene Scarlet M-G | 4 | 1 | x | x | 1 | | | | | |
| Sumiplene Violet M-B | 3 | 3 | 1 | 1 | 2 | 1 | 1 | x | 1 | x |
| Sumiplene Violet M-RR | 3 | 3 | 1 | 1 | 1 | | | | | |
| Sumiplene Blue M-G | 5 | 5 | 2 | 2 | 2 | 2 | 2 | x | 2 | 1 |
| Sumiplene Blue M-3R | 5 | 5 | 1 | 2 | 2 | | | | | |
| Sumiplene Navy Blue M-G | 5 | 4 | 2 | 1 | 2 | 2 | 1 | x | 1 | x |
| Sumiplene Green M-G | 5 | 5 | 2 | 2 | 2 | 2 | 2 | 1 | 2 | 1 |
| Sumiplene Green M-B | 5 | 4 | 1 | 2 | 1 | | | | | |
| Sumiplene Brown M-R | 4 | x | x | 1 | 1 | x | x | x | 1 | x |

Note 1:
(a) Resin compositions, polypropylene plus 0.5% of Ni, Zn, Sn, Cr, Pb, Ca, Ba, Cd, Mg or Al stearate.
(b) Ink composition; each dye 20%, vaseline 10%, ethylcellulose 20%, and toluene 50%.
(c) Heating conditions 140° C., 10 minutes.
(d) Test specimens were washed with toluene after the heat treatment.

Note 2:
5 means no color change under outdoor conditions in Tokyo district for 1 year (May, 1965–April, 1966); 4 means no color change under outdoor conditions in Tokyo district for 6 months; 3 means no color change under outdoor conditions in Tokyo district for 3 months; 2 means no color change under outdoor conditions in Tokyo district for 1 month; 1 means no color change under outdoor conditions in Tokyo district for 1 week; x means no reaction.

The dyes diffused into shaped articles and combined with metal, can not be transferred by heat nor extracted by solvents.

Furthermore, they can not be discolored by acid, base, and bleaching agent.

This may be due to excellent chemical resistance of the surface of the articles. The coloring materials deposited in the articles can not be taken off or otherwise scraped with knife and the like.

The depth of diffusion of dyes usually ranges about 0.01 mm. to about 0.3 mm., although it may vary dependent on heating temperature and time, and also on the type of dyes. Relationship between heating temperature and time and the type of dyes which is determined on polypropylene containing 0.5% Ni stearate is shown in Table 2.

TABLE 2.—DEPTH OF DIFFUSION OF DYES (MM.)

| Dyes | Heating temperature, °C. | Heating time (minutes) | | | | |
|---|---|---|---|---|---|---|
| | | 2 | 4 | 8 | 16 | 32 |
| Polyplon Blue GCL | 100 | | | 0.02 | 0.05 | 0.10 |
| Polyplon Red BL | | | | 0.04 | 0.08 | 0.13 |
| Polyplon Blue GCL | 120 | | 0.03 | 0.08 | 0.15 | 0.28 |
| Polyplon Red BL | | | 0.05 | 0.13 | 0.20 | 0.30 |
| Polyplon Blue GCL | 140 | 0.02 | 0.07 | 0.15 | 0.24 | 0.35 |
| Polyplon Red BL | | 0.04 | 0.09 | 0.18 | 0.30 | 0.38 |
| Polyplon Blue GCL | 160 | 0.04 | 0.10 | 0.21 | 0.32 | |
| Polyplon Red BL | | 0.06 | 0.14 | 0.24 | 0.36 | |
| Polyplon Blue GCL | 180 | 0.05 | 0.15 | 0.27 | | |
| Polyplon Red BL | | 0.06 | 0.19 | 0.37 | | |

Tests were carried out on polypropylene containing 0.5% of nickel stearate.

After generating coloring materials, the printed surface of the article is washed with solvent such as benzene to remove ink residues left on the surface. Then printed design, figures or characters appear on the surface. Glaze of the painted surface of the article is same as that of the unprinted surface.

In order to gain above described excellent print on the surface of molded article, an ink is provided which may diffuse its colorant or dye into the article without injuring the surface of the article. The ink, of course, must not contain any constituent which may react with reactive dyes for the ink. The ink must not contain solvent which dissolves the article so that the ink may not injure the surface of the article on which the ink is applied. The ink must have limited fluidity when heated, for one way to diffuse its containing dye into the article and for, the other way, not to dim the contour of printing. In other words, the ink, when heated, must soften rather than dry and solidify. Polyolefinic and polyetheric resins are resistant to solvents, so that special caution is not necessary for them to injure their surfaces with solvents. The ink contains a wetting agent as a removal agent. The wetting agent for the present ink must dissolve the dyes and, when heated, must be flowable but not boil or evaporate. Such wetting agents include mineral oils, animal or vegetable fats or oils, plastisizers, higher fatty acids and their derivatives. All of these are benzene soluble. When the ink which contains any one of above described wetting agents is heated, it melts and wets the surface of the article on which the ink is applied, to get smooth diffusion of its dye into the article. About 3–30% of wetting agent based on the ink is used. When more wetting agent is used, printability of the ink is adversely affected. Liquid wetting agent at ordinary conditions has a tendency to make ink undried. But in particular cases, two components system ink which consists of a dye component and a wetting agent component is used.

Addition of wetting agent to ink makes lower adhesive strength of the ink film to the article. However this lower adhesive strength is favorable for the present inventive method which comprises the final step to remove the residual ink film left on the surface of the article. Other basic constituents of the ink are ones conventionally used for adapted particular printing machines.

As above described, the ink used in the present invention contains reactive dye and wetting agent. In the practice of color printing using this ink, heating is necessary as well as contacting the ink onto the shaped or molded article of thermoplastic resins or rubbers at the surface to be printed. Color printing of the present invention is effected by heating. Heating to a temperature higher than 50° C. and below the softening point of the thermoplastic resin to be printed is required. When the surface to be printed is heated to such a temperature, dye in the ink begins to diffuse into the article. The higher heating temperature and the longer heating time get the deeper diffusion of the dye. Then, diffused dye reacts and is bound with the organometallic compound present there, to produce coloring material. Therefore, before heating, the article is not colored. Many dyes react at temperatures between 50 and 60° C., but some at a temperature higher than 90° C. For such dye, a lower heating temperature is sufficient to diffuse dye but not sufficient to make dye react with organometallic compound. Thus, heating to a temperature as high as possible but below the softening point of the thermoplastic resin to be printed, is desirable. Suitable heating temperature and time are 100–120° C. and 5–10 minutes for polyethylene and polybutene, 140–160° C. and 5–10 minutes for polypropylene and rubbers, and 65° C. and 30–60 minutes for polystyrene, polyvinylchloride and acrylic resins. The ink may be applied at room temperature to the surface of the article to be printed and then the printed article may be heated to the required temperature. Alternatively, either or both the article to be printed and the ink may have been heated before application of the ink. The whole article may be heated, or only the part to which printing is applied may be heated. Essentially, the surface of the article on which ink has been contacted, is required to be heated to a temperature higher than 50° C. Any heating source of steam, gas, electrical heater, infrared lamp or radio heater may be used. In some cases dipping in hot water may be conducted.

Any one of relief, intaglio, gravure, offset and silk screen printing method may be used. And hand writing, ink spraying or dipping into ink may be used.

As above described in accordance with the process of the present invention, ink is applied on the surface of the article to be printed. And then the printed article or the printed part of the article is heated to diffuse dye in the ink into the article, to react organometallic compound present in the article and to deposit coloring material. Other components of the ink will remain on the surface at which the ink is applied. These ink components left on the surface after the deposit of coloring material have different color from the produced coloring material, and so must be removed. The ink employed in the process of the present invention contains wetting agent. This wetting agent, as described, lowers the adhesive strength of the ink film to the surface of the article. Thus, the ink residues left on the surface can be easily washed off therefrom by water or solvents such as benzene. Removing the ink residues, then color print produced by the present process appears. Printed surface of the article has same glaze as that of uprinted surface, because solvent which attacks themoplastic resins or rubbers is not employed.

According to the present invention, color of the print is determined by the color of the material being produced by the reaction between the dye diffused into, and organometallic compound already contained in the article. The color of the print depends on heating temperature and time and quantity of organometallic compound. The color of the present print is not determined by color and quantity of attached ink which in ordinary printing determines the color of the print. Thus, color of the present print before and after heating is entirely different.

Organometallic compound present in the surface layer of the depth to which dye in the ink diffuse, can be useful for the color development in the present invention. However, when all the organometallic compound in the layer is exhausted, excessively diffused dye may not find organometallic compound to be combined. Therefore, the article from which organometallic compound has been completely exhausted, cannot be used for coloring by the method of the present invention.

As above described, the method of the present invention for coloring thermoplastic on rubber molded articles, is particularly unique.

The present invention will be more fully explained by the following examples. They are illustrative and do not limit the scope of the invention. All examples refer to parts by weight, unless otherwise defined.

EXAMPLE 1

A dish of Delrin resin (polyether resin from Du Pont Co.) was made by injection molding. On molding 0.05% of zinc stearate was added to Delrin. On the surface of this dish a design was printed. For printing, ink having following composition was used. Then the printed dish was heated in a furnace at 160° C. for 10 minutes. After cooling the dish to room temperature, the printed surface of the dish was washed with benzene to remove ink residue.

Then the color print of the design appeared on the surface of the dish.

| Composition of the ink used: | Parts |
|---|---|
| Polyplon Red BL (dye) | 10 |
| Vaseline (wetting agent) | 5 |
| Ink base | 85 |

| | |
|---|---|
| Ethyl cellulose | 20 |
| Dibutyl phthalate | 2 |
| Dammar gum | 5 |
| Toluene | 50 |
| Ethanol | 23 |

EXAMPLE 2

Using polyethylene containing 0.2% nickel stearate, a pipe was extruded. While this pipe was still hot and at a temperature of 100–120° C., a trademark was stamped on the pipe. For stamping, ink of the following composition was used. After stamping, the pipe was cooled. The cooled pipe was passed through benzene to wash off adhered ink. Thus, residual heat of extruded pipe, could be used for color printing of the trademark.

| Ink composition: | Parts |
|---|---|
| Polyplon Blue GCL (dye) | 10 |
| Stearic amide (wetting agent) | 5 |
| Ink base | 85 |

| | |
|---|---|
| Ethyl cellulose | 20 |
| Dibutyl phthalate | 5 |
| Toluene | 75 |

EXAMPLE 3

0.5% of zinc naphthenate dissolved in benzene was mixed with polyethylene, and then dried. Using this polyethylene, a vase was blow molded by extrusion machine. On this vase a design was printed using ink of the following composition. This printed vase was heated at 110° C. for 10 minutes to diffuse dye contained in the ink into polyethylene and to deposit coloring material. After the heat treatment the vase was washed with 1% soda ash solution to remove the ink film to develop color print of the design under the film.

| Usel ink composition: | Parts |
|---|---|
| Sumiplene Yellow M-3G (dye) | 12 |
| Stearic acid (wetting agent) | 8 |
| Oleic acid (wetting agent) | 2 |
| Ink base | 78 |

| | |
|---|---|
| Nitro cellulose | 20 |
| Phthalic acid resin | 5 |
| Dibutyl phthalate | 5 |
| Butyl acetate | 20 |
| Toluene | 50 |

EXAMPLE 4

A mixture containing polypropylene, 0.01% of dibutyl-tin-dilaurate, and 0.3% of zinc stearate was extruded into a sheet of 2 mm. thickness. This sheet was vacuum molded into a box. Using ink of the following composition, trademark was stamped on a surface of the box. Only the stamped surface was heated by infrared lamp of 140° C. for 15 minutes to diffuse the dye in the ink into the resin, and to deposit coloring material.

The treated surface was washed with toluene to remove the ink film. Under the removed film the fixed color print of the trademark was found.

| Ink composition: | Parts |
|---|---|
| Sumiplene Blue MG (dye) | 15 |
| Dioctyl phthalate (wetting agent) | 10 |
| Ink base | 75 |

| | |
|---|---|
| Rosin modified phenolic resin | 10 |
| Ethyl cellulose | 10 |
| Xylene | 60 |
| Ethanol | 20 |

EXAMPLE 5

A mixture of polyethylene powder and 0.5% of zinc palmitate was put in a steel mold. The mold was heated and rotated. Thus, by Engel process a tub of the thermoplastic resin was made. Using ink of the following composition trademark was printed on the surface of the tub. The printed tub was heated at 110° C. for 10 minutes to diffuse the dye in the ink to deposit coloring material. Then the resilual ink film on the surface was washed off with benzene.

| Ink composition: | Parts |
|---|---|
| Polyplon Blue FGL (dye) | 13 |
| Soybean oil (wetting agent) | 12 |
| Ink base | 75 |

| | |
|---|---|
| Low polymerized vinyl chloride resin | 30 |
| Cyclohexane | 45 |
| Xylol | 20 |
| Dioctyl phthalate | 5 |

EXAMPLE 6

A mixture of copolymer of polyethylene and polypropylene, 0.2% of nickel stearate and 0.3% of zinc stearate was used for injection molding of a tray. The surface of the tray was sprayed with the solution which comprised 4% of Polyplon Green BL, 1% of Vaseline, 3% of pine resin, 5% of ethyl cellulose, 40% of toluene, 17% of butanol and 30% of ethyl acetate. After drying, the tray was heated at 120° C. for 10 minutes and then washed with benzene. Greenish tray was produced. A design was engraved on this greenish tray. The engraved design appeared white and had exposed the untreated surface of the substrate. This reappeared untreated surface can be recolored. This tray with the engraved design was sprayed with the same solution as above described except containing Polyplon Orange GL instead of Polyplon Green BL. After the same heat treatment as above described, the tray was washed with benzene. The greenish tray with engraved design of orange color was produced.

EXAMPLE 7

A mixture of polypropylene and 0.5% of nickel stearate was injection molded into a jewel box. This box was designed with two kinds of ink. The first ink comprized 3% of pine resin, 7% of polystylene, 80% of benzene, and 10% of Polyplon Green BL. The second contained same ingredients as the first except 10% of Polyplon Violet RL instead of Polyplon Green BL. This designed box was dipped into the hot solution of a temperature 98° C. to 100° C. which comprized 7% of Polyplon Brown TL, 5% of Turkey red oil and 88% of water. Then the tray was washed in benzene to remove the ink film. A brown jewel box with design of green and purple colors is obtained.

EXAMPLE 8

Polyvinyl chloride floor tile which is composed of 100 parts of vinyl chloride, 25 parts of dioctyl phthalate, 350 parts of calcium carbonate, 100 parts of asbestos, 15 parts of rosin, and 10 parts of dibasic lead stearate may be, in its state as it is, sensitive to dyes used in the process of the present invention. However to improve light resistance of coloring materials, 5 parts of nickel stearate was added to this floor tile compound. And this addition compound was calender-rolled to be formed into floor tile. On the surface of this tile design of flowers was printed with the ink of the composition: 10% of Polyplon Ccarlet RL, 10% of polyethylene-glycol-monostearate, 25% of polyoxyethylene-oleil-ether, 3.5% of ammonium thiocyanate, 0.1% of tartaric acid, 0.9% of carboxy methyl cellulose, 24% of dextrin, and 26.5% of water. This printed tile was heated at 65° C. for 1 hour. After cooling, the tile was washed with water to remove the ink. The floor tile with printed design was produced.

EXAMPLE 9

A mixture of calcon resin (polyether type resin from Celanese Corp. of America) and 0.1% of zinc stearate was injection molded into a fountain-pen-holder. This holder was dipped into the solution of the following composition to coat its surface. This coated holder was heated at 150° C. for 10 minutes. Then the holder was washed with toluene to obtain colored fountain-pen-holder.

| The composition of the solution: | Percent |
|---|---|
| Sumiplene Red M–3B (dye) | 10 |
| Paraffin wax (wetting agent) | 5 |
| Pine resin (wetting agent) | 2 |
| Toluene (solvent) | 83 |

EXAMPLE 10

Polystyrene mixed with 0.05% of aluminium stearate was injection molded to form a radio-cabinet. On the surface of the cabinet, trademark was printed using the ink of the following composition. The printed cabinet was heated at 65° C. for 1 hour. After cooling, the cabinet was washed with alcohol.

| Ink Composition: | Parts |
|---|---|
| Polyplon Red 3BL (dye) | 10 |
| Liquid paraffin (wetting agent) | 5 |
| Ink base | 85 |
| Ethel Cellulose | 20 |
| Shellac | 5 |
| Ethanol | 75 |

EXAMPLE 11

ABS resin and AS resin of polystrene type could be colored in entirely same manner as Example 10.

EXAMPLE 12

The resin compound containing 100 parts of vinylchloride, 5 parts of dioctyl phthalate, 3 parts of dibutyl-tin-1 maleate and 20 parts of calcium carbonate could be colored due to the existence of tin salt. However, the colored materials produced by this salt has poor light resistance. Therefore, the resin compound which contained additional 1.0 part of nickel stearate was extruded to form a pipe. This pipe was printed on its surface with trademark using the ink of the composition: 10% of Polyplon Blue Black BL, 5% of Vaseline, 20% of ethyl cellulose, and 65% of ethanol, followed heating at 65° C. for 20 minutes and washing with ethanol.

EXAMPLE 13

Vessel of vulcanised rubber composed of 100 parts of natural rubber, 1 part of zinc-dibutyl-dithio-carbamate, 5 parts of stearic acid, 3 parts of sulphur, 1 part of age resister, 5 parts of zinc oxide, and 50 parts of calcium carbonate were sensitive to the ink of the following composition, because it contains zinc salt.

| Ink composition: | Parts |
|---|---|
| Sumiplene Blue MG | 10 |
| Stearic acid | 5 |
| Ethyl cellulose | 20 |
| Ethanol | 65 |

Using this ink, a design was printed on the surface of the vessel. The vessel was heated at 140° C. for 10 minutes and then washed with ethanol, to obtain the colored design on the surface.

EXAMPLE 14

0.5 part of zinc stearate, as coloring additive, was mixed with a synthetic rubber compound composed of 100 parts of nitrile rubber (Hycar 1042), 5 parts of zinc oxide, 1 part of stearic acid, 25 parts of dibutylphthalate, 50 parts of calcium carbonate, 1.5 parts of sulphur, 1.5 parts of dibenzo-thiazyl-disulfide, and 0.15 part of zinc dimethyl-dithio-carbamate. This mixture was pressed at 155° C. to cure. This molded article could be colored with the ink described in Example 13.

EXAMPLE 15

Methylmethacrylate monomer mixed with 0.03% of zinc oleate, and 0.2% of dibutyl-tin-dibutyl-mercaptide was cast into a sheet of 3 mm. thickness. This sheet was further fabricated into an indoor ornament. On this surface trademark was printed with the ink described in Example 10. The printed ornament was heated at 65° C. for 1 hour and then washed with alcohol to develop the trademark with color.

EXAMPLE 16

A molded article which is composed of synthetic rubber, such as S.B.R. or neoprene could be colored with the method described in Example 14.

What I claim is:

1. A method for printing on a molded articles of a thermoplastic synthetic resin or rubber, said article containing at least 0.01% by weight of an organometallic compound, which comprises contacting an oily ink containing a reactive dye which can transfer in the thermoplastic synthetic resin or rubber with the molded article, heating the molded article with the ink at a temperature higher than 50° C. but lower than the softening temperature of the molded article to allow the reactive dye contained in the ink to penetrate the article and simultaneously react with the organometallic compound to form a non-transferable, stable coloring matter, whereby a printing pattern due to the coloring matter is formed, cooling the article and then removing the ink remaining on the surface of the molded article, said oily ink containing an ink base which is a solution of an elastomer in an organic solvent, a reactive dye and 3.0 to 30.0% by weight of a removal agent which serves to remove the ink in the last step.

2. A method according to claim 1, wherein the removal agent is a mineral oil, a wax, a plasticizer, a higher fatty acid or a derivative thereof.

3. A method according to claim 1, wherein the organometallic compound is at least one of the salts of a fatty acid having 13 to 20 carbon atoms, naphthenic acid, carbonic acid and maleic acid with Ni, Zn, Al, Pb, Sn, Cr, Cd, Ca, Ba and Mg.

4. A method according to claim 1, wherein the thermoplastic synthetic resin is a polyolefin, a polyether, a polyvinyl chloride, a polystyrene, a polymethyl methacrylate, a polycarbonate, or a copolymer thereof or a blend thereof.

5. A method according to claim 1, wherein the rubber is a natural rubber, a styrene-butadiene rubber, nitrile-butadiene rubber, or neoprene rubber.

6. A method according to claim 1, wherein said shaped or molded article is produced by any one of injection, extrusion, blow, powder, casting, compression, and calender molding method.

7. A method according to claim 6, wherein the molded article is made of a polyolefin, a polyether, a polyvinyl chloride, a polystyrene, a polymethyl methacrylate, a polycarbonate, or a copolymer or blend thereof.

8. A method according to claim 6, wherein the molded article is made of a natural rubber, a styrene-butadiene rubber, a nitrile-butadiene rubber or a neoprene rubber.

References Cited

UNITED STATES PATENTS

| | | | |
|---|---|---|---|
| 2,754,218 | 7/1956 | Magie | 106—22 |
| 2,884,332 | 4/1959 | Locher | 106—22 |
| 2,984,634 | 5/1961 | Caldwell et al. | |
| 3,009,760 | 11/1961 | Lene | 8—4 |
| 3,273,498 | 9/1966 | Martin | 106—28 X |
| 3,371,981 | 3/1968 | Itoh | 8—4 |
| 3,421,833 | 1/1969 | Wunderlich. | |
| 3,248,378 | 4/1966 | Behrenbruch et al. | |
| 3,317,272 | 5/1967 | Wunderlich et al. | |
| 3,385,652 | 5/1968 | Walter et al. | |

RALPH S. KENDALL, Primary Examiner

U.S. Cl. X.R.

8—4, 83; 106—22; 117—102, 118; 264—78, 132